Dec. 9, 1952 E. E. ROSE 2,620,632
AUTOMATIC CONTROL MECHANISM FOR SOOT BLOWERS
Filed March 31, 1950 5 Sheets-Sheet 1

INVENTOR.
Earl E. Rose.
BY
Harness, Dickey & Pierce
ATTORNEYS.

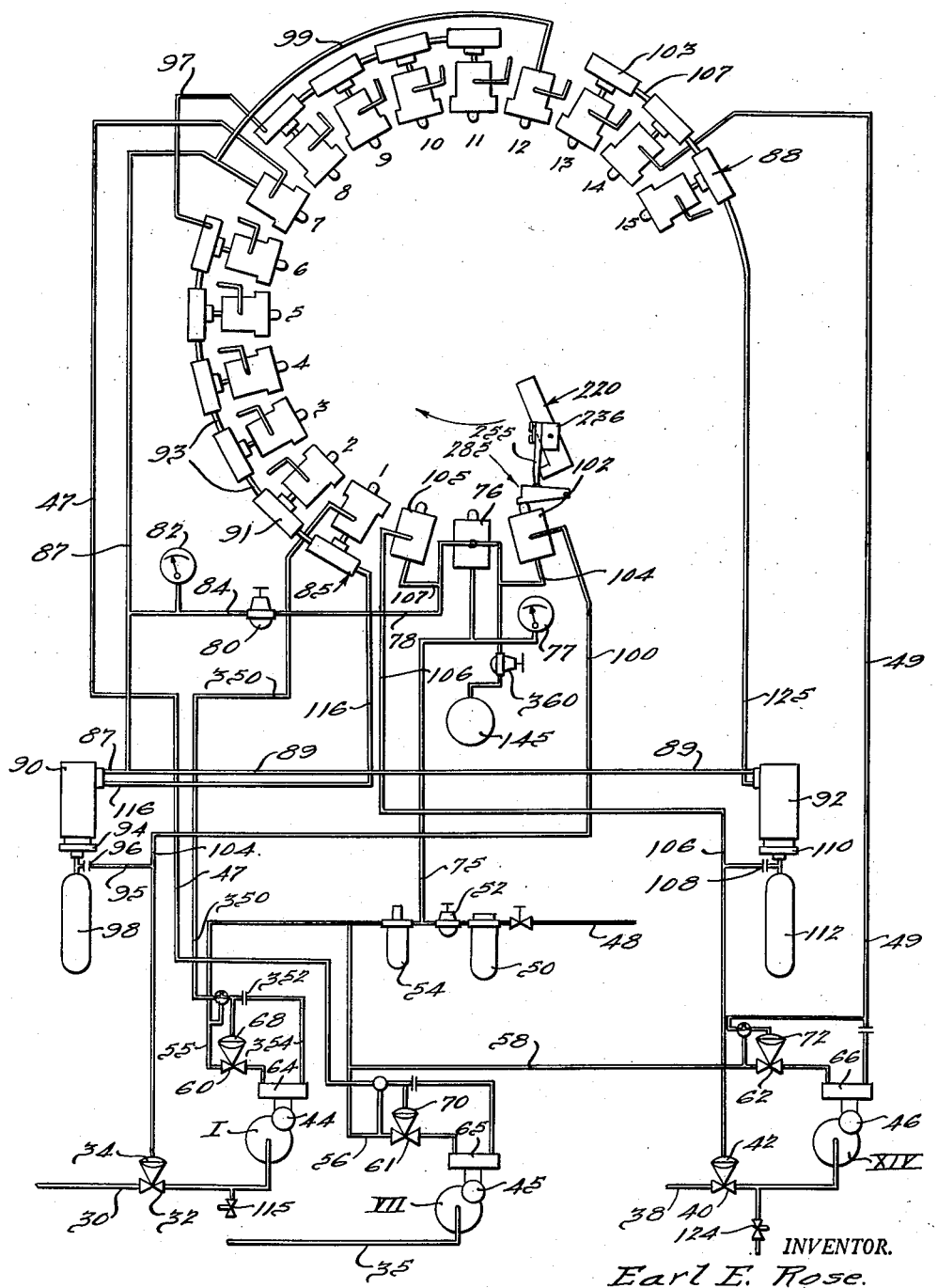

INVENTOR.
Earl E. Rose.

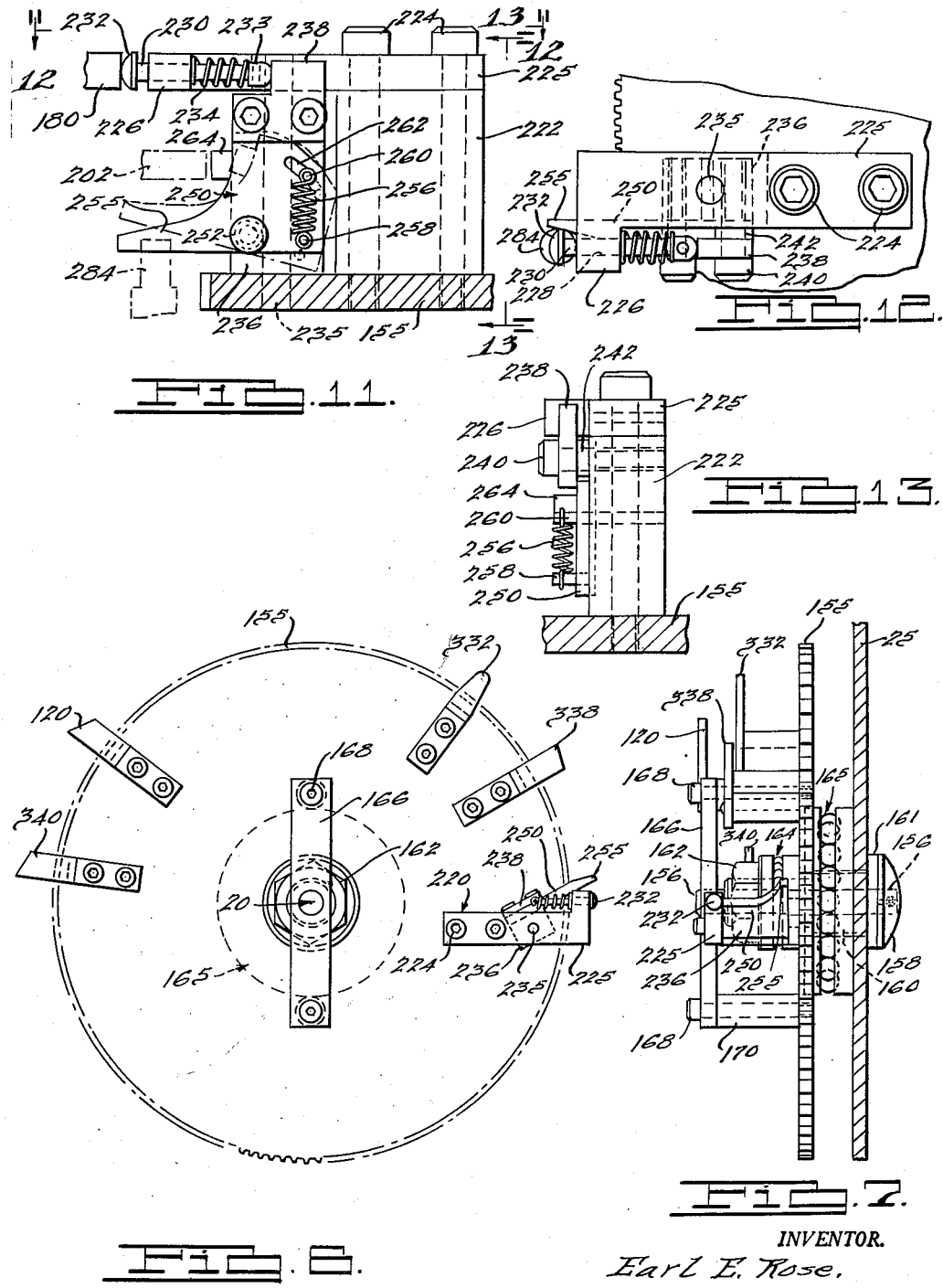

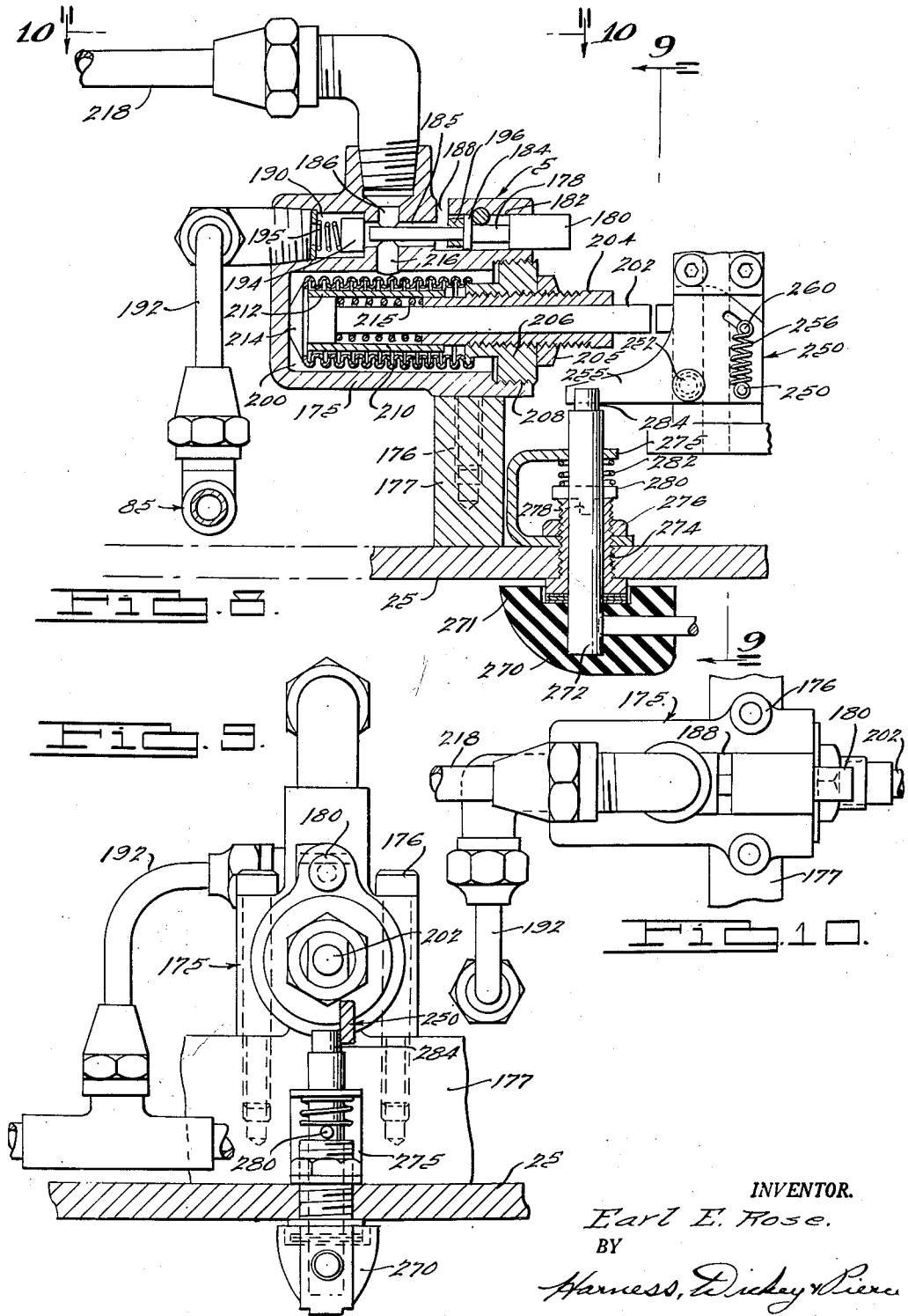

Patented Dec. 9, 1952

2,620,632

UNITED STATES PATENT OFFICE 2,620,632

AUTOMATIC CONTROL MECHANISM FOR SOOT BLOWERS

Earl E. Rose, Detroit, Mich., assignor to Diamond Power Specialty Corporation, a corporation of Ohio Application March 31, 1950, Serial No. 153,093

21 Claims. (Cl. 60—97)

The present invention relates to controlling mechanisms for regulating the action of a plurality of intermittently operable devices, in such manner that a plurality of controlled devices may be made to function in a predetermined but readily variable sequence, either in a fully automatic or semiautomatic manner, or under the direct supervision of an operator.

While the invention is disclosed in connection with the control of cleaning devices of the type classed as "soot blowers," for boilers and other heat exchangers, it will be appreciated that the principles of the invention are readily applicable to the control of other types of mechanisms.

An important object of the invention is to provide control mechanism of the indicated character which is adapted to be located at a central controlling station, and to regulate the action of a plurality of soot blowers or other controlled devices in such manner that the controlled devices are automatically started, regulated in their action, and stopped in desired sequence, the complete operating cycle being automatically repetitive in character, so that no human intervention is required at any time unless it is desired to interrupt or change the character of the operating cycle.

A related object is to provide such an improved control mechanism so designed that any and all phases of the operating cycle can be quickly and easily changed or interrupted at any stage of the operation without danger of damaging the mechanism or the controlled elements.

Still another object is to provide such improved control mechanism which is compact, neat in appearance, which is adapted to be tightly enclosed and effectively protected against the dust, flyash and vapors commonly encountered in boiler installations, and which incorporates simple but graphic indicator means by which the operator may observe at all times the phases of operation in progress, and also the setting of the various components of the mechanism, so that he is constantly able to check the character of the operating cycle which the apparatus is set to perform at any given time.

Other objects and advantages of the invention will become apparent upon consideration of the present disclosure in its entirety.

In the drawings:

Fig. 2 is a schematic diagram of an automatic soot blower system of a type adapted to be controlled by my improved mechanism;

Fig. 5 is a cross-sectional view taken substantially on the line 5—5 of Fig. 4, and looking in the direction of the arrows;

Fig. 6 is a rear elevational view of the master valve actuating cam disk;

Fig. 7 is a sectional detail taken substantially on the line 7—7 of Fig. 3 and looking in the direction of the arrows;

Fig. 8 is a sectional view of one of the panel unit valve assemblies, taken substantially on the line 8—8 of Fig. 1 and looking in the direction of the arrows;

Fig. 9 is a sectional elevational view of the same, taken substantially on the line 9—9 of Fig. 8, and looking in the direction of the arrows, but with a portion of an operating latch assembly, which is fragmentarily illustrated in Fig. 8, removed;

Fig. 10 is a rear elevational view taken substantially as indicated by the line and arrows 10—10 of Fig. 8;

Fig. 11 is a partly diagrammatic sectional elevational view corresponding to a cross section, taken substantially on the line 11—11 of Fig. 3, the valve actuating plate-holding dog being swung to a different position in Fig. 11 from the showing thereof in Fig. 3;

Fig. 12 is a rear sectional elevational view, taken as indicated by the line and arrows 12—12 of Fig. 11;

Fig. 13 is a sectional elevational view taken substantially on the line 13—13 of Fig. 11 and looking in the direction of the arrows.

The control mechanism of the present invention is intended to constitute a main or central supervisory controlling agency for a control system especially adapted for use in regulating the action of a plurality of soot blowers. The invention constitutes an improvement upon the disclosure of Curtis L. Howse application Serial No. 88,854, filed April 21, 1949, now Patent No. 2,565,689, issued August 28, 1951, and is also intended to coact with subordinate controlling mechanism for each individual soot blower, which subordinate controlling mechanism may be constructed and arranged in accordance with the disclosure of LeRoy S. DeMart application Serial No. 94,413, filed May 20, 1949. A complete control system incorporating control mechanism embodying the present invention is diagrammatically illustrated in Fig. 2. Certain of the components shown in Fig. 2 are not illustrated in other views, since they form in themselves no part of my present invention.

Figure 1:
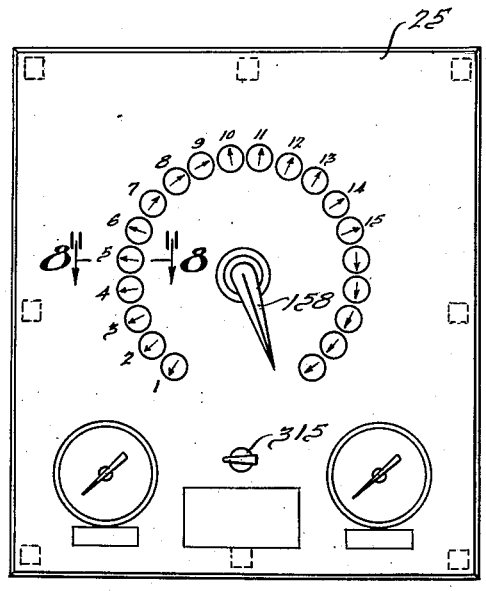
Figure 1 is a front elevational view of the control panel of a soot blower control mechanism constructed in accordance with the principles of the present invention.

Soot blowers as employed in large water tube boilers are ordinarily arranged to be operated in a predetermined sequence. Frequently it is desirable that some of the blowers discharge saturated steam against the surfaces to be cleaned, while others discharge air, and still others discharge superheated steam. It is common practice to arrange the blowers to operate in a cycle which involves first the operation of one or more saturated steam blowers in sequence, then one or more air blowers, then one or more superheated steam blowers, the blowers being operated in a sequence such that the material loosened from the heat-exchanging surfaces is swept toward the stack by the air and gases of combustion. The system illustrated in the present application is arranged to control the operation of fifteen blowers, only three of which are diagrammatically represented in Fig. 2. One of these, a saturated steam blower, is designated I; another, which is an air blower, is designated VII; another, which is a superheated steam blower, is designated XIV. These three blowers comprise one of each class previously referred to, and the activation thereof is controlled in response to the actuation of individual unit control valves mounted upon a master control panel 25 arranged in a central location, as for example at the main control station for the boiler, conveniently accessible to, and observable by, the operating engineers. The unit control valves are successively numbered 1 to 15 inclusive, the numerical sequence corresponding to the sequence in which the blowers governed thereby are operated in accordance with the normal or intended full operating cycle of the system. The unit control valves are mounted upon the rear of the panel 25 in such manner that they are disposed concentrically about a common central axis located near the middle of the panel and designated 28. The positions corresponding to the individual locations of the respective unit control valves may also be designated on the face of the panel by the numbers 1 to 15, which are actually inscribed or labeled on the face of the panel, as shown in Fig. 1, for the convenience of the operator, since these same numbers are ordinarily used in operating practice to designate the individual soot blowers corresponding thereto. The face of the panel is arranged and equipped to constantly indicate the status of the system with respect to the operation of the blowers. The illustrated panel is of such size that it can accommodate and control the action of twenty blowers without compounding, but only fifteen blowers are presumed to exist in the illustrative installation depicted.

Every saturated steam blower is supplied with saturated blowing steam through a steam supply pipe as 30, and a diaphragm-operated valve as 32 is provided for each saturated steam blower. This valve is normally closed, but is adapted to be opened when air under suitable pressure (e. g. 35 p. s. i.) is supplied to its actuating diaphragm chamber 34. Blowing air for the blower VII, and the other air-operated blowers, may be supplied through an air supply pipe as 35 which may provide a continuous connection between a source of blowing air and the blower, since the valve in the blower itself is sufficient to turn on and off the supply of blowing air. Superheated steam for the blower XIV and the other superheated steam blowers is supplied through a steam pipe as 38, and a diaphragm-operable steam valve 40 is provided for controlling the supply of superheated steam to each such blower. The actuating diaphragm chamber for the valve 40 is designated 42, and this valve is also arranged to be opened when air is supplied thereto at the control pressure which, as previously indicated, may be of the order of 35 p. s. i.

The blowers I, VII and XIV are presumed to be of the reversible rotary retracting type, and are driven by individual air motors 44, 45 and 46. Motor power air is delivered from a source (not shown) through a conduit 48 through suitable filtering, regulating and conditioning means such as the filter 50, automatic pressure regulator 52, and lubricator 54. Individual branch power air supply pipes 55, 56 and 58 lead to the air motors 44, 45, 46, respectively, but each such branch supply pipe incorporates a diaphragm-operated valve 60, 61, 62, and a motor control valve as 64, 65, 66. Each of the valves 60, 61 and 62 may comprise a conventional diaphragm-operated valve or its equivalent, but each of the motor control valves 64, 65, 66 preferably corresponds, if the blower is reversible, to the valve mechanism disclosed in LeRoy S. DeMart application Serial No. 60,435, filed November 17, 1948. The diaphragm-operating chambers for the valves 60, 61 and 62 are respectively designated 68, 70 and 72, these parts being arranged so that their respective valves are biased to close, but are adapted to be held open when air at the control pressure is maintained in the diaphragm chamber. Each of the valves 64, 65, 66 is adapted to be mechanically actuated, ordinarily by the blower itself, in such manner as to reverse the direction of rotation of the air motor when the blower is to be reversed. The details of construction of the reversing mechanism and actuating means for such reversing valves will vary in accordance with the construction of individual blowers formed for the performance of different specialized cleaning functions. Preferred examples of such reversing valve mechanisms are disclosed in DeMart application Serial No. 94,413, previously referred to, but these details are subject to variation and form no part of my present invention.

The control air may be taken from the same air supply conduit 48 which furnishes the motor power air as through a branch conduit 75 which leads to a main start-stop valve, generally designated 76, and which may comprise a plunger-operated two-way valve mounted on the control panel 25. A pressure gage 77 is connected to the conduit 75 to furnish an indication of motor power air pressure. From the outlet of the start-stop valve 76, the air is taken through a conduit 78 to a pressure reducing valve 80, which drops the pressure to the desired control pressure, illustratively indicated as of the order of 35 p. s. i. A pressure gage 82 is incorporated in the outlet conduit 84 from the pressure reducing valve 80.

Each of the unit control valve assemblies 1 to 15 inclusive, previously referred to, incorporates a plunger-operated three-way valve portion, the construction of which will subsequently be considered. The control valves for all of the blowers which are operated by saturated steam are connected to a common manifold system as 85. The manifold assembly is formed of conventional tubing members and may comprise a plurality of T's as 91, one such T being provided for each control valve assembly, arranged outside the same, but substantially in the same plane and in generally tangential position. The T's for the several unit valves intended to control blowers operating upon saturated steam are connected by short conduits 93, 97, and the air feed conduit 116 for such manifold system 85 may be connected to one end of the T for unit control valve 1, as shown in Fig. 2. As shown, the valves operated by saturated steam comprise the valves 1 to 6 inclusive, and 8 to 11 inclusive. The two unit control valves 7 and 11 for the air blowers are connected to one another by a conduit 99 which is connected to an air supply conduit 87. The unit control valves for the saturated steam blowers are connected to a manifold assembly 88, the construction of which is generally similar to the manifold assembly 85.

The air delivery conduit 87 for the air blowers is directly connected to the air outlet conduit 84 from the pressure reducing valve 80. The manifold assembly 85 for the saturated steam blowers is connected to the control air supply conduit 84 through the pressure-operable time controlled valve 90, and the manifold assembly 88 for the superheated steam blowers is connected to the control air supply conduit 84 through a pressure-operable time controlled valve 92. The valve 90 is operable by a pressure diaphragm assembly 94 connected to a conduit 95 which is also connected, through an orifice element 96, to a calibrated timing receiver 98. Conduit 95 is connected by means of a conduit 100 which also leads to the actuating diaphragm chamber 34 for the automatic saturated steam valve 32 to the outlet of a two-way supplemental start-stop valve 102 for the saturated steam blowers. Valve 102 is mounted on the control panel 25. The inlet of supplemental start-stop valve 102 is connected by means of a conduit 104 to the outlet of the main start-stop valve 76.

Also connected to the outlet of valve 76, by a conduit 107, is a two-way supplemental start-stop valve 105 for the superheated steam blowers. The outlet of valve 105 is connected by means of a conduit 106 through an orifice member 108 to an actuating diaphragm assembly 110 for the time controlled valve 92 and to a timing receiver 112.

As soon as operation of the system is initiated by opening of the main start-stop valve 76, air is delivered through conduit 104 to the supplemental start-stop valve 102. Valve 102 is of the normally closed-type, but is opened at the commencement of the operating cycle so that air is delivered to the timing receiver 98 through the conduits 100, 95. Because of the characteristics of the orifice member 96 and of the timing receiver, a predetermined interval is required before the pressure in the diaphragm chamber 94 builds up to a value sufficient to open the valve 90. The valve 32 is opened immediately, however, by the delivery of air to the chamber 34, and during the interval before the valve 90 opens, the steam pipes to the saturated steam blowers warm up and condensate therein is drained, through means such as the conventional impulse steam trap 115. When the valve 90 opens, air is delivered from the control air supply conduit 84 and valve 90 through conduit 116 to the manifold assembly 85.

The supplemental start-stop valve 105 is of the normally closed-type, but means is provided to bias it to the open position. It is closed, however, at the commencement of the operating cycle. The action and construction of this valving means will be considered hereinafter. After the blower 11 has completed its operation, the supplemental start-stop valve 102 is closed by an actuating element 120. Valve 102 then vents the line 100, thereby allowing both of the valves 32 and 90 to close, interrupting the supply of steam to the saturated steam blowers and also interrupting the supply of control air to the manifold section 85. After blower 12 has completed its operation and before the commencement of operation of blower 13, which is the first of the superheated steam blowers, supplemental start-stop valve 105 is opened by an actuator 122. Air is thereby delivered through conduit 106 to the actuating diaphragm chambers 42, 110 for the valves 40 and 92, respectively. The superheated steam valve 40 is thereby opened immediately and, during the interval before opening of the valve 92, condensate formed in the superheated valve is drained through the impulse trap 124. When the valve 92 opens, air is delivered to the manifold section 88, and operation of the saturated steam blowers connected to the unit control valves 13, 14 and 15 then commences.

Figure 3:
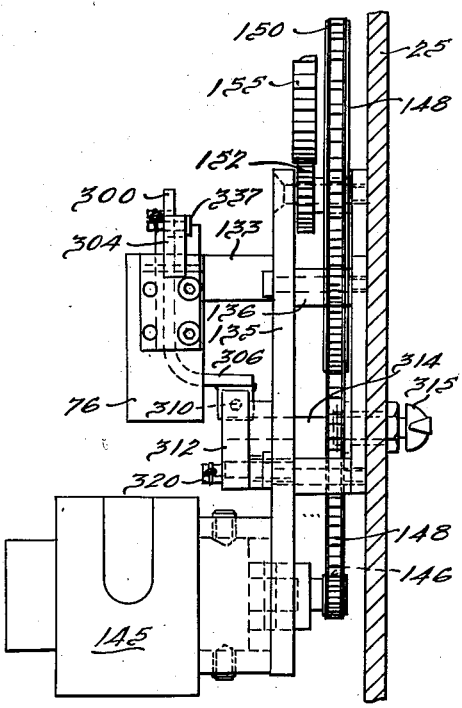
Fig. 3 is a rear elevational view of the panel illustrated in Fig. 2, showing the control mechanism carried thereby.

The control air supply conduit 75 is connected, as shown in Fig. 3, to a coupling 130 mounted behind the panel 25 and connected to the pressure gage 77 and to the inlet of start-stop valve assembly 76.

The start-stop valve 76 is operable by means of a plunger 132, the start-stop valve and plunger 132 being mounted concentrically with the valves 1 to 15, inclusive, with respect to the axis 20. All of the unit control valves 1 to 15, inclusive, are mounted in a single plane parallel to and relatively close to the back of the panel 25, being secured by screws 176 to a supporting ring 177 which is attached to the back of the panel, concentrically surrounding the actuating disk 155. The start-stop valve 76 is mounted with its actuating plunger 132 at the same distance from the back of the panel as the unit valve plungers 180. Valve 76 is carried by a bracket 133 attached to a triangular supporting plate 135 spacedly secured to the back of the panel by posts 136. The plate 135 also carries the saturated steam supplemental start-stop valve 102, and the superheated steam supplemental start-stop valve 105. Valves 102, 105 are also supported so that their actuating stems 138, 140, respectively, are in radial positions and concentric with the axis 20, and valve 102 is at the same distance from panel 25 as the valves 1—15 and 76, but the valve 105 is mounted nearer the panel. The conduits connecting these several valves have been largely omitted from the showing of Fig. 3 to assist in clarity of illustration of the principal mechanical components, but the manner in which the tubing or other conduits connecting the valves is connected is clearly shown in Fig. 2.

The plate 135 also supports, near the bottom thereof, a relatively low power air motor 145, which drives a pinion 152 through a sprocket 146, chain 148, and driven sprocket 150. Pinion 152 turns a gear 154 formed as a toothed section cut upon the rim of a plate 155 journaled on the back of the panel 25 to rotate in a plane parallel therewith and concentric with the axis 20. The plate 155 carries camming and actuating devices for the several radially disposed valves previously described. The preferred method of rotatably supporting the plate 155 is indicated in Figs. 6 and 7. A shaft 156 extends perpendicularly through the panel, being located upon the axis 20, and carries on the front of the panel an indicating hand or pointer 158. The shaft is rotatable in a bearing collar 160, also fastened in the panel and having a flange 161 overlying the face of the panel beneath the hub of the pointer. The plate 155 is rotatable upon the outside of the bushing 160 and is held thereon by a nut 162 threaded upon the rear end of the bushing. A ball thrust bearing assembly 164 is interposed between the nut and the rear face of the plate 155, and another ball thrust bearing assembly 165 is interposed between the plate 155 and the back of the panel 25. The shaft 156 projects through and from the rear end of the bushing and a diametrically extending bar 166 is secured to the rear end of the shaft. Both ends of bar 166 extend radially outwardly far enough to clear the nut 162 and thrust bearing 164. The ends of the bar are secured to the plate 155 at such outspaced positions, as by means of screws 168 and posts 170. The pointer thus rotates with the plate, and the plate and pointer are supported by the panel through the agency of an axially positioned supporting assembly which requires no unsightly attaching devices on the face of the panel.

Each of the unit control valves 1 to 15, inclusive, is incorporated in a casing as 175. Since the construction of all of these assemblies is alike, description of one will suffice. Referring to Figs. 8, 9 and 10, wherein the construction of valve assembly 5 is shown, the valve element itself comprises a stem section 178 formed integrally with a plunger 180 which projects radially inwardly for actuation by an actuating device carried by the plate 155. The plunger 180 and stem 178 are slidable in a drilled hole 182 in the body 175. The stem 178 carries a spool 184 slidable in the hole 182 and the stem also projects through an axial passage 185 which is substantially larger than the stem and which serves to connect the valve outlet port 186 to a vent opening 188 which communicates with the atmosphere, and also to a valve inlet port 190 which is adapted to be connected as by means of a conduit 192 to the manifold section 85. The inlet port 190 is formed as an enlarged chamber containing a valve element 194 which is normally held against the end of passage 185 by a compression spring 195. Valve element 194 is adapted to be opened against the air pressure delivered to the port 190 from the manifold 85 when the stem 178 is pushed inwardly in response to actuation of the plunger 180. When the stem is pushed inwardly to unseat the valve element 194, an annular valve pad 196, arranged upon the stem 178 between the spool 184 and the reduced central passageway section 185, is forced against the right end of passage 185, as the parts are viewed in Fig. 8, to close communication between the port 186 and vent 188.

Also formed in the body 175 is a cylindrical chamber 200 parallel to and slightly spaced from the plunger 180 and the valve components just described. A plunger 202 is slidable within and projects from the end of the chamber parallel to the plunger 180. Plunger 202 is slidably supported in an externally threaded adjustable bearing sleeve 204 adapted to be secured as by a lock nut 205 threaded thereon and which bears against a head bushing 206 which completes the closure of the right end of the chamber 200, and is supported in the threaded mouth portion 208 of the chamber by suitable external threads and internally threaded to receive the threaded bearing sleeve 204. A bellows diaphragm 210 is sealed at one end and fixedly secured to the head bushing 206, the other end of the bellows diaphragm extending movably into the chamber and being supported by, but slidable over, a sleeve 212 attached to and forming a rearward extension of the bearing sleeve 204. A head 214 is secured to the inner end of the plunger 202 and sealed with respect to the corresponding inner end of the bellows diaphragm. The sleeve 212 is slidable upon the smooth inner end of the bearing sleeve 204 and rigidly secured to the head portion 214. A helical compression spring 215 encircles the plunger 202 between the head 214 and the inner end of the bearing sleeve 204 to urge the plunger 202 inwardly, tending to distend the bellows diaphragm.

The chamber 200 communicates through a passage 216 with the reduced axial valve passage 185 and port 186. Port 186 is adapted to be connected to a conduit 218 which comprises the control conduit leading to the control mechanism for the blower connected to the blower 5. In the case of each of the valve assemblies 1 to 15 inclusive, the plunger 202 is parallel to the valve actuating plunger 180, the axes of both of such plungers lying upon a plane which is radial with respect to the axis 20 and perpendicular to the panel 25. The plungers 202 also project inwardly toward the axis 20 somewhat farther than the plungers 180.

Carried by the disk 155 is an actuating assembly, the body of which is generally designated 220, which is provided with means for actuating all of the unit valves 1 to 15 inclusive, and also for opening the main start-stop valve 76 and the supplemental saturated steam start-stop valve 102. The actuator consists of a substantially rectangular upstanding body portion 222 projecting substantially perpendicularly and in radial position from the back of the disk 155, to which it is secured by screws 224, which also serve to secure to the top of the block-like supporting body portion 222 a cap plate 225. The body portion 222 is spaced inwardly from the rim of the disk 155 and the cap plate 225 projects outwardly, overhanging the disk 155 and projecting therefrom. A laterally projecting arm portion 226 of the cap plate 225 is provided with a radial hole 228 extending entirely therethrough and in which is slidable a plunger 230 having a button-like head portion 232 which is so positioned that it is adapted to engage the outer end of each of the actuating plungers as 180 of the several unit valves 1—15, and also to engage actuating arms 285 and 300 for the valves 102, 76, respectively. The stem portion of the plunger 230 extends inwardly from the supporting arm portion 226, and is provided at its inner end with a head 233. A helical compression spring 234 is arranged upon the stem between the head 233 and the arm 226, tending to retract the plunger head 232 to a position in which it does not engage the valve actuating plungers 180. Even when so indrawn, however, the head 232 is engageable with arms 285, 300, since these arms project radially inwardly farther toward the axis 20.

Pivoted upon an axis perpendicular to the disk 155, by means of a pin 235 mounted in the disk 155 and in the cap plate 225, and extending between these two in the space radially outside the block 222, is a pivoted block 236 swingable about the supporting pin 235. Pivoted block 236 carries a plate 238 secured to its side as by means of a screw 240, but plate 238 is spaced outwardly from the side of the block by a spacer 242. The block 236 is of rectangular cross section, and when it is swung to a position such that plate 238 lies in a plane parallel to the axis of the plunger stem 230, as shown in Fig. 12, the head 232 is projected far enough to depress the actuating plunger portion 180 of any one of the unit valves 1—15 with which it may engage. When the block 236 is free to swing about the supporting pin 235, however, the spring 234, acting through the plate 238, swings the block and plate to the angular position shown in broken lines in Fig. 12, and in full lines in Fig. 3, at the same time retracting the plunger head 232, so that it clears the actuating stems of the unit valves 1—15.

Pivoted on the side of the block 236 for swinging movement toward and from the disk 155 is a dog member 250. The pivot pin which secures the dog to the block 236 is designated 252. The dog 250 is also formed of a flat plate-like metal piece and is mounted closer to the side of the block 236 than is the valve plunger actuating plate 238. The pivot pin 252 is located near the lower edge of the plate, as the parts are viewed in Fig. 11, that is, relatively close to the disk 155. An upper portion of the dog, remote from the pivot pin 252, projects slidably beneath the valve plunger actuating plate 238, so that the dog is in effect retained both by the pin 252 and by the overhanging engagement of the plate 238 therewith. A relatively long tapering nose portion 255 of the dog extends outwardly parallel to the side of the block 236. The pawl is yieldably held in a position in which the nose portion 255 projects outwardly substantially parallel to the disk 155, by means of a helical tension spring 256, one end of which is secured to a pin 258 carried by the dog, and the other end of which is secured to a pin 260 which is carried by the block 236 and which projects outwardly therefrom through a clearance slot 262 in the dog.

Carried by a portion of the dog 250 spaced outwardly or upwardly, as the parts are viewed in Fig. 11, from the pivot pin 252, is a button-like abutment 264 located in a position such that its orbit carries it parallel to the ends of the plunger 202, previously described, and relatively close to the ends of such plunger, so that when any such plunger is projected by its bellows diaphragm, means, previously described, the plunger is capable of forcing the button portion 264 inwardly and thereby rocking the dog 250 clockwise as viewed in Fig. 11, against the opposition of the spring 256.

Appurtenant to each of the numbered positions on the face of the panel 25 is a knob as 270 carried by a shaft 272 journaled in a suitable bearing bushing 274 supported in the panel. Each such shaft projects rearwardly from the bearing bushing through a U-shaped bracket portion 275 which, as shown in Fig. 8, may be secured by the bearing bushing securing nut 276. A pair of diametrically opposed slots 278 are formed in the inner end of the bearing bushing 274, and the shaft 272 carries a diametrically projecting cross pin 280, which is movable into and out of the slotted portion 278 when the shaft is moved longitudinally with the pin aligned with the slotted portion. The shaft is also rotatable when the pin is out of the slot, so that the shaft may be locked in the inwardly projected position in which it is shown in Fig. 8. A helical compression spring 282 on the shaft between the pin 280 and the rear bearing arm of the bracket portion 275 urges the shaft outwardly and the pin into the slot. An inner end portion 284 of the shaft 272 constitutes an abutment which is movable, by longitudinal movement of the shaft 272 in the manner described, into and out of a blocking position, wherein it lies in the path of the nose portion 255 of the dog 250. In Fig. 8, the abutment portion 284 is shown in the blocking position, but it will be seen that if the shaft 272 is rotated approximately one-quarter turn from the position shown, the spring will move the shaft outwardly, forcing the pin 280 into the slot 278 and moving the abutment portion 284 out of the path of the dog. The actuating knobs 270 for the shafts are provided with pointer portions 271, which are preferably so oriented that when the pointer portion points outwardly away from the axis 20, the abutment portion 284 is in the blocking position, while when the pointer lies substantially on a tangent, the abutment portion is withdrawn. One such knob and abutment assembly is provided for each blower, and is appurtenant to the unit control valve assembly for its blower, and as shown in Fig. 1, all of the knobs for the fifteen blowers connected to the illustrative control panel there depicted, are positioned so that the abutment portion connected thereto is in the blocking position with the exception of units 7, 8 and 9. In the case of blowers 7, 8 and 9, the knobs are turned so that the abutment portions are retracted. The five unnumbered knobs which, considered in a clockwise direction, are arranged after the knob for unit 15 shown in Fig. 1 are also turned to the tangent position. As previously noted, in the illustrated control system, it is assumed that no blowers are connected to the positions corresponding to these last five units, and as will subsequently be explained, it is not desired to arrest rotation of the dog and the connected actuator plate 155 except as and for the duration of the time during which each blower is intended to function.

Figure 4:
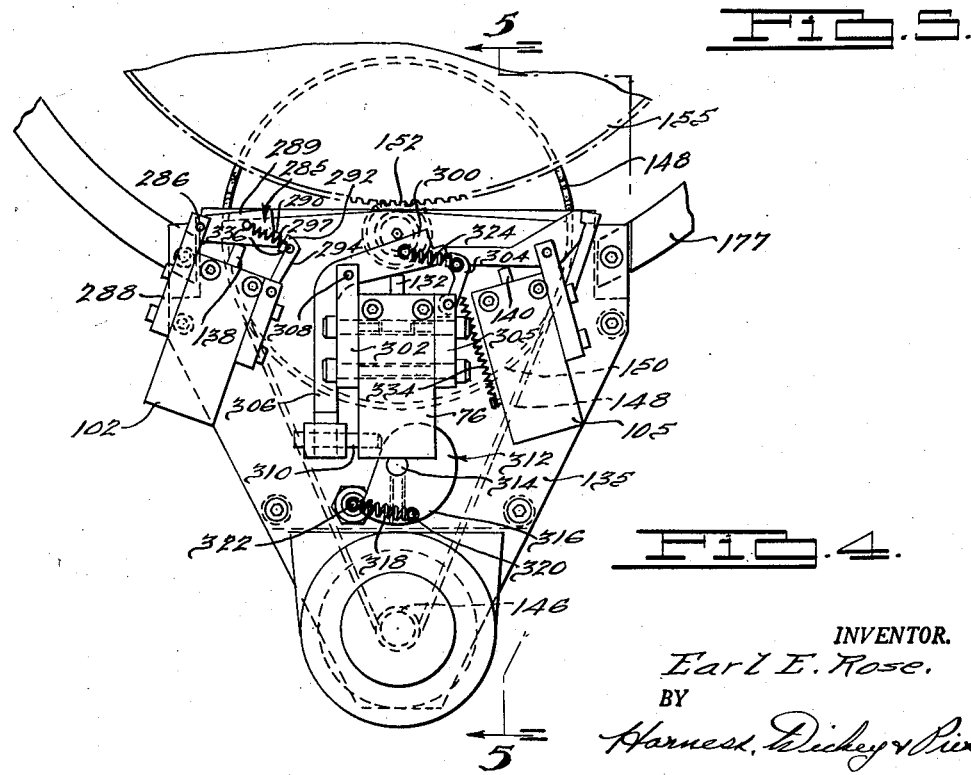
Fig. 4 is an elevational view on a still larger scale of the portion of Fig. 3 enclosed in the circle designated 4.
Figure 3:
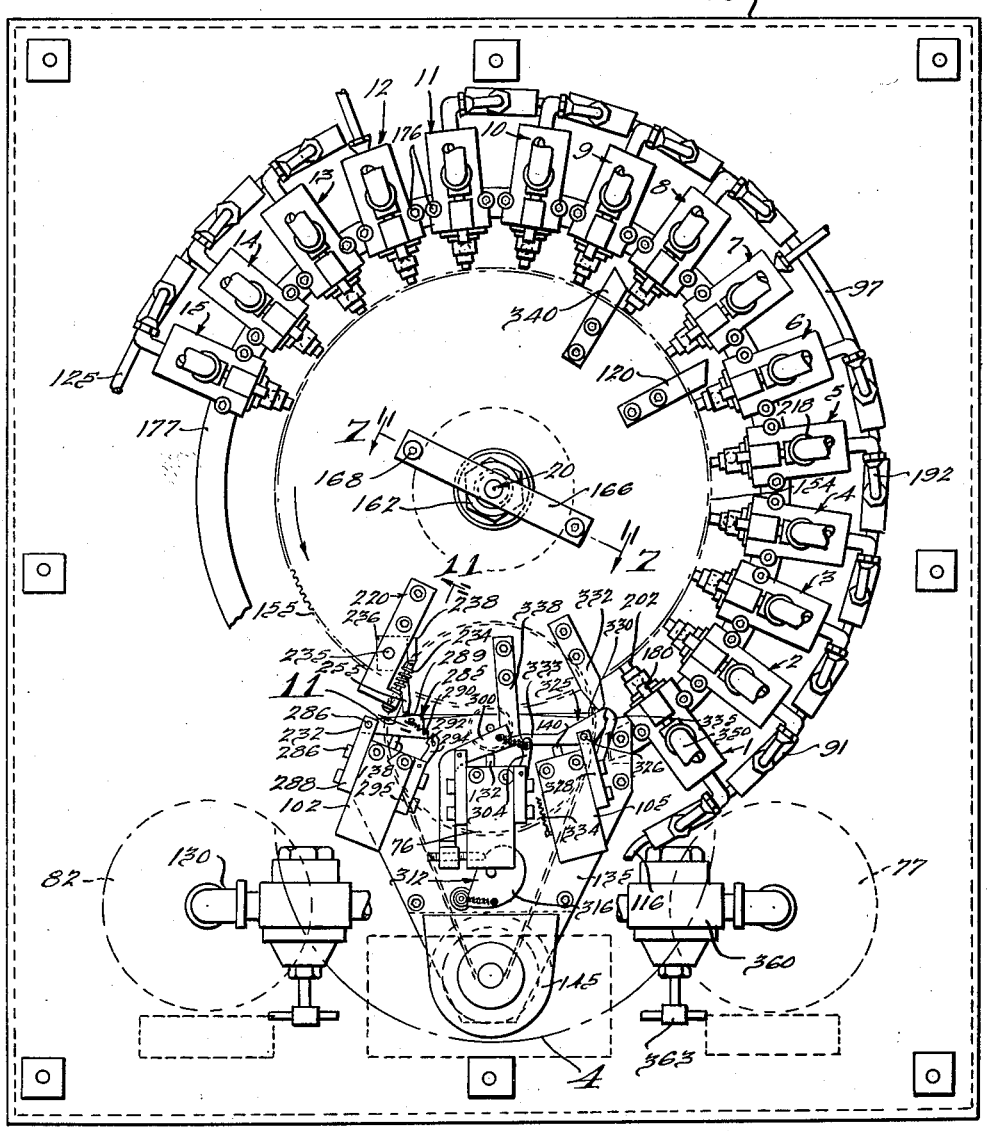

The remaining structural features may be considered in connection with a description of the operation of the components thus far described. Although the cycle may, as previously noted, be set to repeat continuously and automatically, it will be assumed that the pointer 158 and actuator assembly 220 are initially in the positions shown in the Figs. 1, 2, 3 and 4. As shown in Figs. 3 and 4, the saturated steam supplemental start-stop valve 102 is closed, the plunger 138 thereof being projected. This valve is provided with a plunger actuating arm 285 pivoted upon a pin 286 carried by a bracket piece 288 secured to the side of the body of the valve 102. The actuating arm is movable in a path parallel to the plunger 138 and overlies the same, and is provided with a smooth, flat inclined surface 289 lying in the path of the head portion 232 of plunger 230, the actuator 285 and valve plunger 138 being so proportioned that the actuator is movable outwardly to push the plunger 238 inwardly of the valve and to open the valve when the actuator surface 289 is engaged by the button 232 even when, as shown in Figs 3 and 4, the button is in its retracted position. As shown in these views, the button 232 and plunger 230 are retracted under the influence of the spring 234, and the block 236 and dog 250 are rocked counterclockwise, as viewed in rear elevation in Fig. 3, about the axis of the supporting pivot pin 235.

Thus as the actuator 220 moves counterclockwise about the axis 20, as viewed in Fig. 3, the dog 250 is inclined angularly forwardly in the direction of the movement. When the actuator 285 is cammed inwardly by button 232 to open the saturated steam valve 102, a lug 290 on the outer end of the actuator is moved inwardly far enough to engage under an overhanging latch hook portion 292 formed on a latch element 294, which is pivoted upon a bracket as 295 secured to the body of valve 102 upon the side opposite the bracket 288. The latchpiece 294 is urged toward overengaging relation with the lug portion 290 by a spring 297, so that after the actuator assembly 220 has passed beyond the valve 102, such valve is held open by the latchpiece.

The main start-stop valve 76 is also provided with a similarly pivoted actuating arm 300 carried by a supporting bracket 302 attached to the side of the body of valve 76. The arm 300 is engageable in like fashion with the actuating plunger 132 for the valve 76, and is adapted to be latched in a position in which it holds the plunger depressed and valve 76 open, by means of a latch member 304 pivoted on a bracket 305 attached to the side of the body 76 opposite the bracket 302. The arm 300 is positioned similarly to the arm 285, in such manner that it is engageable by the button 232 so that the valve can be opened when the button engages the arm even though the button is in the indrawn position. Another lever arm 306 formed integrally with the arm 300 and pivoted therewith upon the same pivot pin 308 extends outwardly beside the body 76, and also extends forwardly toward the panel 25 (see Figs. 4 and 5). Arm 306 carries at its outer lower end an adjustable follower pin 310 engageable with a cam 312 fast upon a shaft 314 which extends forwardly through the panel, an actuating knob 315 being secured to the shaft on the face side of the panel. The cam 312 is of such eccentric shape that it can be turned to a position in which, as shown in Fig. 4, it is effectively disengaged from the follower stem 310, or alternatively it may be rotated to force a lobe portion 316 thereof of increased radius against the stem 310 to rock the bell crank formed by the arms 300, 306 clockwise, as viewed in Fig. 4, in such manner as to push the plunger 132 inwardly of the valve 76 to open the valve. An overcenter spring 318 is provided, tending to hold the cam 312 in either position to which it is turned. The spring comprises a helical tension spring secured at one end to a pin 320 on the cam, and at the other end to a pin 322 secured to the plate 135. When the cam is in the released position shown, the valve 76 is actuable in the same fashion as the valve 102, and when the arm 300 is moved inwardly to the full open position, it is latched by the latchpiece 304 which then holds the valve open. The latchpiece 304 is urged toward the latched position by a relatively light tension spring 324, which is stretched between the latch member and the arm 300. Neither spring 324 nor spring 297 is strong enough to overcome the effect of the valve biasing springs (not shown) which maintain the plungers 132, 138 projected, unless positively held in the pushed-in position by one of the means described.

The supplemental superheated steam control start-stop valve 105 is internally biased to closed position, that is, it is closed when its plunger 140 is projected under the influence of the internal biasing spring (not shown). The valve plunger is actuatable by a double-armed lever 325 pivoted near its central portion upon a pin 326 carried by a bracket piece 328 mounted upon the side of the body of valve 105. The actuating lever 325 has an inclined arm 330 which is engageable by the rounded nose of an actuating cam member 332 mounted upon and projecting radially from the disk 155. The cam 332 and arm portion 330 are located at a different distance from the face of plate 155 from the other apparatus which is actuatable by the disk supported elements 120 and 232, so that only the cam 332 can engage the arm 330. The lever 325 also includes an arm 333 extending generally in the opposite direction from arm 330, to a position somewhat beyond the opposite side of the body of valve 105. Arm 333 overlies and is engageable with valve plunger 140. A counterbiasing spring 334 is connected to the end of arm 333, and to the side of the valve 105. Spring 334 exerts greater force upon the plunger 140 than does the internal biasing spring in the valve, so that if the lever 325 is free to move, the internal valve biasing spring will be overcome by spring 334 and the valve will, in effect, then be biased to the open position. The arm 333 is out of the path of all of the actuating elements carried by the disk 155. When the lever 325 is rocked clockwise, as viewed in Figs. 3 and 4, by engagement of the cam 332 with arm 330, the lever is adapted to be latched in such position, in which the arm 333 is raised and the valve is closed, by means of a latchpiece 335 pivoted upon the bracket 328, and normally urged into overhanging and latching engagement with respect to the arm 330 to maintain it in the valve-closed position.

As previously stated, the cycle ordinarily commences with the parts in the relative position indicated in Fig. 3. Although the latchpieces 294, 304 are positioned at the same distance from the disk 155, they are provided with lugs projecting in opposite directions and which are individually engageable by kick-off members 120, 338, respectively. The kick-off lug portion on latchpiece 294 may comprise the pin 336 which serves as an anchor for latch spring 297 and which extends outwardly away from the panel. The kick-off lug portion on latchpiece 304 extends inwardly toward the panel as shown in Fig. 5, such lug portion being designated 337. Thus the kick-off arms 120, 338 are at different distances from the panel from the other actuating elements carried by the disk 155, arm 120 traveling in an orbit somewhat farther out from the panel than button 232 and arm 338 in an orbit somewhat closer to the panel than button 232.

Latchpiece 335 is provided with an actuating portion at a different distance from the panel, indicated as closer thereto and engageable by the correspondingly closer kick-off member 340. The offset relationship of these parts which prevents interference between them is shown in Fig. 7.

At the commencement of the operating cycle, the kick-off arm 338 strikes the lug 337 of latchpiece 304, releasing it from engagement with the valve actuating arm 300 and allowing the main start-stop valve 76 to open. Air is then delivered through the pressure reducing valve 80 and conduits 87, 99 to the unit valves 7 and 12 for the air blowing units, as previously described. Air is also delivered through conduits 104, 107 to the supplemental valves 102 and 105. The air motor, which has been previously in the stalled condition if the system was not set to operate continuously, now turns the disk 155. The cam 332 rocks lever 325 clockwise and then moves away from the arm 330, but the superheated steam valve remains latched in the closed position. The button 232 carried by the actuator 220 opens and latches the saturated steam supplemental start-stop valve 102, which in the manner previously described causes the opening of the automatic diaphragm-operated steam valve 32, admitting steam to the pipes leading to the saturated steam blowers. At the same time, the timing action of the timing receiver 98 commences, and after the set time has elapsed for the draining of condensate from the saturated steam lines, the valve 90 opens admitting air to the manifold sections 85.

The disk continues to rotate until with the parts set, as shown in the drawings, the nose portion 255 of dog 250 engages the abutment portion 284 which is appurtenant to the first unit control valve assembly 1. The abutment portion 284 tends to arrest rotation of the disk, but the disk rotation continues until, with the abutment holding the nose portion 255, the dog 250 rocks to a radial position parallel to the body of the actuator 220. Such rocking of the dog 250 about the axis of the pin 235 also rocks the supporting block 236 and the plate 238. Plate 238 forces the plunger 230 and button 232 radially outwardly as the disk is brought to a halt, and at such time the button 232 is aligned with the valve plunger 180 of unit valve 1, and depresses such plunger to open valve 1. The air motor is stalled by the arresting of the disk, which stands in this position, with valve 1 held open by button 232, while blower I operates. Air is thus allowed to flow from the manifold 85 through the control line 350 which leads to the actuating diaphragm chamber 68 for the diaphragm-operated motor air control valve 60 for blower I. As previously noted, this is a saturated steam-operated blower, and its operation will commence only after the time controlled valve 90 has opened to permit air to flow in the manner described. Air is also delivered through an orifice member 352 and a conduit 354 to the motor control valve 64, the arrangement and operation of which may correspond to the disclosure of De Mart application Serial No. 60,435, previously mentioned. The disk remains stationary, with the air motor stalled, and the parts held in their described positioning while the blower I runs through its operating cycle. If the blower is of the reversible-type, its action includes traveling in two directions under the control of the motor control valve 64, although this is of course subject to variation without departure from the principles of my present invention. At the completion of operation of the blower, the action of the valve 64 is such, as will be appreciated by those skilled in the art, and as disclosed in the aforementioned application, as to raise the air pressure in the control line 350.

The spring 215 (Fig. 8) which tends to retract the plunger 202 and distend the bellows diaphragm 20 is of such strength that the bellows cannot be compressed, to extend the plunger 202, until the pressure in the control line substantially exceeds the normal control line pressure (35 p. s. i.) but when the control line pressure is raised by the previously-mentioned action of the motor control valve 64, the bellows is compressed and plunger 202 is projected against the button 264 carried by the dog 250. The dog is thereby rocked, clockwise as viewed in Fig. 11, about the pin 252 to lift the nose 255 over the abutment 284. The restraining effect of the abutment is thereby eliminated. The dog and its supporting block 236 snap forwardly by rocking about the supporting pin 235 in a counterclockwise direction, as viewed in Fig. 3, so that the dog again assumes the angular position shown in Fig. 3. As soon as the button 264 leaves the plunger 202, the dog again rocks counterclockwise, as viewed in Fig. 11, under the influence of the spring 256, so that the nose 255 is immediately brought down to the position of its normal orbit, so that it can engage the next abutment portion 284 which is positioned to intercept it. As previously noted, one such abutment is provided for each unit valve. With the parts adjusted as shown in the drawings, all of the first six blowers are set to operate, and the same action is repeated by the control mechanism at each of the stations corresponding to such first six blowers. At all times the pointer 158 indicates on the face of the panel the angular position of the actuating assembly 220, and thereby denotes visually the blower which is operating. The saturated steam valve kick-off arm 120 is attached to the disk 155 in such position that it will strike the lug pin 336 of latchpiece 294 for valve 102 after the last saturated steam blower has completed its operation. The superheated steam kick-off arm 340 is so positioned as to strike the latchpiece 335 before the commencement of operation of the first of the superheated steam blowers (XIII). By releasing the latchpiece 335, arm 340 allows the spring 334 to open the valve 105. This delivers air to the timing receiver 112 and opens the superheated steam valve 40, as previously stated, and the operation of the superheated steam blowers commences as soon as the predetermined interval has elapsed.

At the completion of the operation of the last superheated steam blower, the parts reassume substantially the positioning shown in Fig. 3. The valve 105 is closed by its biasing means as the arm 333 is lifted from the plunger 140 by the cam 332.

If the cam 316 is in the position shown, the arm 338 kicks off the latch 304, valve 76 closes, and the system comes to rest in about the condition shown. If the cam 316 is turned to the position which maintains valve 76 open, however, the tripping of latch 304 by arm 338 has no operative effect and the cycle recommences immediately and continues as long as valve 76 is held open.

In order to restart the system for intermittent operation, it is only necessary to turn the cam 316 by means of the knob 315 to open the main start-stop valve and to allow the cam to remain in this position until the kick-off arm 338 has moved away from the latchpiece 304, permitting the latchpiece to return to latching engagement with the arm 300 and thereby hold the main start-stop valve open for another cycle. The knob is then turned back to return the cam to the position shown, which permits the valve to close at the end of the cycle. If the cam 316 is left in the position in which it rocks the arms 306, 300 to the valve-open position, and thereby holds the valve 76 continually in the open condition as noted, and the operating cycle will repeat indefinitely since the kick-off arm 338, although it can move the latchpiece 304, cannot release the arm 300.

The output pressure of the regulating valve 360 is adjustable by means of a control knob 363, and this serves as speed regulating means for the air motor 145.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

I claim:

1. Control mechanism for a system comprising a plurality of sequentially operable soot blowers or the like, and including a central controlling station, a plurality of controlled stations, and individual control lines leading from the controlling station to the controlled stations, a plurality of control devices at the controlling station individually connected to said control lines, each of such devices being operable to impart an activating impulse to the control line connected thereto for transmission to the corresponding controlled station, said devices being arranged substantially in a circle and in peripherally spaced relation, each of said devices including a diverting element for selectively directing or interrupting the transmission of such an impulse to the control line connected thereto and also including a kick-off member connectable to the control line and including a servomotor responsive to substantial change in the power conditions obtaining in the control line, a traveling actuator including a trip piece successively engageable with said diverting elements to sequentially actuate the same, means for driving said actuator in a path to carry it into such successive engagement with said diverting elements including an actuator motor, holding means including an abutment portion appurtenant to each such device for arresting travel of said actuator in an operative position at each such device, and means responsive to actuation of said kick-off member for releasing holding engagement between the abutment portion and actuator.

2. Control mechanism for a system comprising a plurality of sequentially operable soot blowers or the like, and including a central controlling station, a plurality of controlled stations, and individual control lines leading from the controlling station to the controlled stations, a plurality of control devices at the controlling station individually connected to said control lines, each of such devices being operable to impart an activating impulse to the control line connected thereto for transmission to the corresponding controlled station, said devices being arranged substantially in a circle and in peripherally spaced relation, each of said devices including a diverting element for selectively directing or interrupting the transmission of such an impulse to the control line connected thereto and also including a kick-off member connectable to the control line and including a servo-motor responsive to substantial change in the power conditions obtaining in the control line, a traveling actuator including a trip piece successively engageable with said diverting elements to sequentially actuate the same, means for driving said actuator in a path to carry it into such successive engagement with said diverting elements including an actuator motor, holding means including an abutment portion appurtenant to each such device for arresting travel of said actuator in an operative position at each such device, and means responsive to arresting of the actuator for actuating said trip piece.

3. Means as set forth in claim 1 wherein said actuator motor comprises a fluid operable motor and said holding means includes a latchpiece which physically arrests movement of said actuator and stalls the actuator motor.

4. Means as set forth in claim 2 wherein said actuator motor comprises a fluid operable motor and said holding means includes a latchpiece which physically arrests movement of said actuator and stalls the actuator motor.

5. Mechanism as defined in claim 1 wherein said actuator includes a support, an element movably carried by the support for actuating said diverting elements, said holding means including a latchpiece carried by said support for movement in at least two planes with relation thereto, being operatively connectable with said diverting elements to move the same when the latchpiece is moved in one of said planes, the latchpiece being movable in the other plane to released position to permit resumption of travel of the actuator.

6. Mechanism as defined in claim 1 including a main start-stop controller also arranged in peripherally spaced relation with respect to said diverting elements, said actuator being successively engageable with the start-stop valve and with said diverting elements.

7. In a control system for a plurality of soot blowers or the like, a plurality of peripherally spaced control devices adapted to be individually connected to soot blowers or the like to be controlled, an actuator bodily movable in a closed path which carries it into successive operative engagement with said control devices, releasable latch mechanism for arresting travel of said actuator in positions appurtenant to each such control device, and a relatively low-torque, stallable fluid drive agency for so moving such actuator, said fluid drive agency being adapted to be stalled when travel of the actuator is arrested by said latch mechanism.

8. Means as defined in claim 7, including a plurality of latch releasing mechanisms, one located adjacent to each of said control devices and adapted to be connected to, and operated to latch-released position by, a controlled device connected to the control device to which it is adjacent.

9. In a control system for a plurality of soot blowers or the like, a plurality of peripherally spaced control devices adapted to be individually connected to soot blowers or the like to be controlled, an actuator bodily movable in a closed path which carries it into successive operative engagement with said control devices, releasable latch mechanism including a plurality of abutments located substantially fixedly with relation to said control devices for arresting travel of said actuator in positions appurtenant to each such control device, a displaceable latch member carried by the actuator and engageable with said abutments, and trip means appurtenant to said control devices for disengaging said displaceable latch member from the abutments.

10. In a control system for a plurality of soot blowers or the like, a plurality of peripherally spaced control devices adapted to be individually connected to soot blowers or the like to be controlled, an actuator bodily movable in a closed path which carries it into successive operative engagement with said control devices, releasable latch mechanism for arresting travel of said actuator in positions appurtenant to each such control device, said latch mechanism including an abutment part carried by the actuator, and latch release mechanism appurtenant to each control device.

11. In a control system for a plurality of soot blowers or the like, a plurality of peripherally spaced control devices adapted to be individually connected to soot blowers or the like to be controlled, an actuator movable in a closed path which carries it into successive operative engagement with said control devices, releasable latch mechanism for arresting travel of said actuator in positions appurtenant to each such control device, said latch mechanism including an abutment part carried by the actuator, latch release mechanism appurtenant to each control device, and a plurality of latch-trip servomotors, one operatively connected to each latch release mechanism and also connectable individually to controlled soot blowers to actuate the latch release mechanisms under control of conditions at the respective soot blowers.

12. In a control system for a plurality of soot blowers or the like, a plurality of peripherally spaced control devices adapted to be individually connected to soot blowers or the like to be controlled, an actuator movable in a closed path which carries it into successive operative engagement with said control devices, said control devices comprising power diverting elements adapted to be supplied with power from a common power source and to individually direct power from said source to the respective blowers connected thereto, and a start-stop controller interposed between said control devices and said power source and operable by said same actuator.

13. A system as defined in claim 12 including separately actuatable starting and stopping elements for said start-stop controller, said actuator including peripherally spaced concurrently movable actuating portions individually engageable with said starting and stopping elements.

14. In a control system, a plurality of peripherally spaced unit control valves adapted to be individually connected to remotely located controlled mechanisms for soot blowers or the like, a traveling actuator movable in a closed path which carries it into successive operative engagement with said unit control valves, releasable mechanism for arresting travel of said actuator in positions appurtenant to each such control valve, and trip-out means for releasing said arresting mechanism to permit resumption of travel of said actuator, including a plurality of servomotors, one such servomotor being appurtenant to each such unit control valve, said servomotors being individually connectable to and actuatable under the supervision of such remotely located soot blower controlled mechanisms.

15. In a system as defined in claim 14, means for connecting a plurality of said unit control valves to a common source of fluid under pressure, a start-stop valve interposed between said unit control valves and said source, said actuator also serving to actuate said start-stop valve.

16. A system as defined in claim 14 including fluid conductive means for connecting a plurality of unit control valves to a common power source, a start-stop valve interposed between said unit control valves and said source, said actuator including a common actuating portion engageable with said unit control valves and with said start-stop valve.

17. A system as defined in claim 14 including fluid conductive means for connecting a plurality of unit control valves to a common power source, a start-stop valve interposed between unit control valves and said source, said actuator including a common actuating portion engageable with said unit control valves and with said start-stop valve, said common actuating portion being movable with relation to other parts of the actuator and operatively connected to said arresting mechanism to be so moved with relation to the remainder of the actuator by said arresting mechanism, the unit control valves being actuatable in response to such relative movement of said common actuating portion.

18. A system as defined in claim 14 including fluid conductive means for connecting a plurality of unit control valves to a common power source, a start-stop valve interposed between said unit control valves and said source, said actuator including a common actuating portion engageable with said unit control valves and with said start-stop valve, said common actuating portion being movable with relation to other parts of the actuator and operatively connected to said arresting mechanism to be so moved with relation to the remainder of the actuator by said arresting mechanism, the unit control valves being actuatable in response to such relative movement of said common actuating portion, said arresting mechanism including a part movable in one direction to actuate said relatively movable common actuating portion and movable in another direction to release said arresting mechanism.

19. In a control system, a plurality of peripherally spaced unit control valves adapted to be individually connected to remotely located controlled mechanisms for soot blowers or the like, a traveling actuator movable in a closed path which carries it into successive operative engagement with said unit control valves, releasable mechanism for arresting travel of said actuator in positions appurtenant to each such control valve, and trip-out means for releasing said arresting mechanism to permit resumption of travel of said actuator, including a plurality of servomotors, one such servomotor being appurtenant to each such unit control valve, said servomotors being individually connectable to and actuatable under the supervision of such remotely located soot blower controlled mechanisms, said unit control valves being adapted to be connected to a common source of fluid under pressure, a start-stop valve interposed between said unit control valves and said source, separately actuatable parts for opening and closing said start-stop valve, said actuator having peripherally spaced portions individually engageable with said separately actuatable parts to open and close said start-stop valve when the actuator is in different positions.

20. In a control system, a plurality of peripherally spaced unit control valves adapted to be individually connected to remotely located controlled mechanisms for soot blowers or the like, a traveling actuator movable in a closed path which carries it into successive operative engagement with said unit control valves, releasable mechanism for arresting travel of said actuator in positions appurtenant to each such control valve, trip-out means for releasing said arresting mechanism to permit resumption of travel of said actuator, including a plurality of servomotors, one such servomotor being appurtenant to each such unit control valve, said servomotors being individually connectable to and actuatable under the supervision of such remotely located soot blower controlled mechanisms, said unit control valves being adapted to be connected to a common source of fluid under pressure, a start-stop valve interposed between said unit control valves and said source, separately actuatable parts for opening and closing said start-stop valve, said actuator having peripherally spaced portions individually engageable with said separately actuatable parts to open and close said start-stop valve when the actuator is in different positions, and a supplemental start-stop valve interposed between the previously mentioned start-stop valve and certain of said unit control valves, and portions spacedly carried by said actuator for actuating said start-stop valve and supplemental start-stop valve.

21. In a control system for a plurality of soot blowers or the like, a plurality of peripherally spaced control devices adapted to be individually connected to soot blowers or the like to be controlled, an actuator bodily movable in a closed path which carries it into successive operative engagement with said control devices, releasable latch mechanism for arresting travel of said actuator in positions appurtenant to each such control device, said latch mechanism including a fixed abutment appurtenant to each control device, an abutment part carried by the actuator and movable bodily therewith and also movable relatively thereto to blocking and non-blocking positions, means biasing said part to the blocking position wherein it may be arrested by one of said fixed abutments, and latch release mechanism appurtenant to each control device and engageable with the abutment part to move said part to non-blocking position.

EARL E. ROSE.

REFERENCES CITED

The following references are of record in the file of this patent:

UNITED STATES PATENTS

| Number | Name | Date |
|---|---|---|
| 627,385 | Brockie | June 20, 1899 |
| 2,088,261 | Dienenthal | July 27, 1937 |
| 2,241,807 | Cotner | May 13, 1941 |
| 2,301,028 | Esch | Nov. 3, 1942 |
| 2,327,524 | Hibner et al. | Aug. 24, 1943 |